(12) United States Patent
Sunami et al.

(10) Patent No.: US 9,727,965 B2
(45) Date of Patent: Aug. 8, 2017

(54) MEDICAL IMAGE PROCESSING APPARATUS AND MEDICAL IMAGE PROCESSING METHOD

(71) Applicant: TOSHIBA MEDICAL SYSTEMS CORPORATION, Otawara-Shi (JP)

(72) Inventors: Kimiko Sunami, Otawara (JP); Masahiro Ozaki, Otawara (JP); Kazumasa Arakita, Nasushiobara (JP)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 98 days.

(21) Appl. No.: 14/939,248

(22) Filed: Nov. 12, 2015

(65) Prior Publication Data

US 2016/0148364 A1    May 26, 2016

(30) Foreign Application Priority Data

Nov. 25, 2014 (JP) ................. 2014-237381
Oct. 28, 2015 (JP) ................. 2015-211495

(51) Int. Cl.
*G06T 7/00* (2017.01)

(52) U.S. Cl.
CPC .. *G06T 7/0014* (2013.01); *G06T 2207/10081* (2013.01); *G06T 2207/10088* (2013.01); *G06T 2207/20104* (2013.01); *G06T 2207/20224* (2013.01); *G06T 2207/30012* (2013.01)

(58) Field of Classification Search
CPC ... G06T 3/0068; G06T 7/0014; G06T 7/0016; G06T 7/11; G06T 7/136; G06T 7/30; G06T 2207/20224; G06T 2207/30008; G06T 2207/30012; G06T 2207/30021; G06T 2207/30101; A61B 6/52; A61B 6/5229

See application file for complete search history.

(56) References Cited

U.S. PATENT DOCUMENTS

| 7,778,490 B2 | 8/2010 | Quist ........................... 382/294 |
| 8,675,944 B2 | 3/2014 | Razeto et al. ............... 382/131 |
| 2015/0117727 A1* | 4/2015 | Mohr et al. .......... G06F 19/321 382/128 |
| 2015/0257845 A1* | 9/2015 | Gopalakrishna et al. ........... A61B 19/50 600/424 |

FOREIGN PATENT DOCUMENTS

| JP | 2002-324238 A | 11/2002 | ............. G06T 7/60 |
| JP | 2012-179359 A | 9/2012 | ............. A61B 6/03 |
| JP | 2014-008414 A | 1/2014 | ............. A61B 6/03 |

* cited by examiner

*Primary Examiner* — Andrew W Johns
(74) *Attorney, Agent, or Firm* — Oblon, McClelland, Maier & Neustadt, L.L.P.

(57) ABSTRACT

According to one embodiment, a medical image processing apparatus includes processing circuitry. The processing circuitry extracts a rigid region from predetermined medical image data among a plurality of items of medical image data. Further, between first medical image data and second medical image data among the plurality of items of medical image data, the processing circuitry performs rigid registration on the rigid region and performs non-rigid registration on a region other than the rigid region.

14 Claims, 5 Drawing Sheets

IDENTIFY RIGID REGION

EXTRACT RIGID REGION

SET MASK REGION BY EXPANDING RIGID REGION

MEDICAL IMAGE PROCESSING APPARATUS AND MEDICAL IMAGE PROCESSING METHOD

CROSS-REFERENCE TO RELATED APPLICATIONS

This application claims the benefit of priority of Japanese Patent Application No. 2014-237381, filed Nov. 25, 2014, and also claims the benefit of priority of Japanese Patent Application No. 2015-211495, filed Oct. 28, 2015, the entire contents of all of which are incorporated herein by reference.

FIELD

Embodiments described herein relate generally to a medical image processing apparatus and a medical image processing method.

BACKGROUND

In the field of medical diagnostic imaging, two or more items of image data in plural time phases are acquired and angiostenosis is assessed or a tissue lesion is detected based on a difference between the images.

The image data acquired in plural time phases can be used to detect an abnormal area through inter-image comparison or a fusion process. Also, a subtraction process between the image data acquired in plural time phases will allow a reference image (subtraction image) for assessment of angiostenosis to be generated from the image data acquired in plural time phases.

In order to improve accuracy of the inter-image comparison and subtraction image, it is important to improve accuracy of registration between images resulting from the image data of plural time phases. Thus, various techniques have been developed for registration between images resulting from image data of plural time phases.

However, between the images resulting from image data of plural time phases, there are often variations in pixel values due to movements of a subject or a contrast medium. Therefore, it is very difficult to perform registration between images with high accuracy.

Also, in the subtraction process, due to changes in image characteristics caused by contrast imaging, some rigid portions do not lend themselves to registration. In this case, displacement of a rigid portion left unaligned will result in misregistration, causing an artifact in the subtraction image and adversely affecting diagnosis.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinbelow, a description will be given of a medical image processing apparatus and a medical image processing method according to embodiments of the present invention with reference to the drawings.

In general, according to one embodiment, a medical image processing apparatus includes processing circuitry. The processing circuitry extracts a rigid region from predetermined medical image data among a plurality of items of medical image data. Further, between first medical image data and second medical image data among the plurality of items of medical image data, the processing circuitry performs rigid registration on the rigid region and performs non-rigid registration on a region other than the rigid region.

Figure 1:
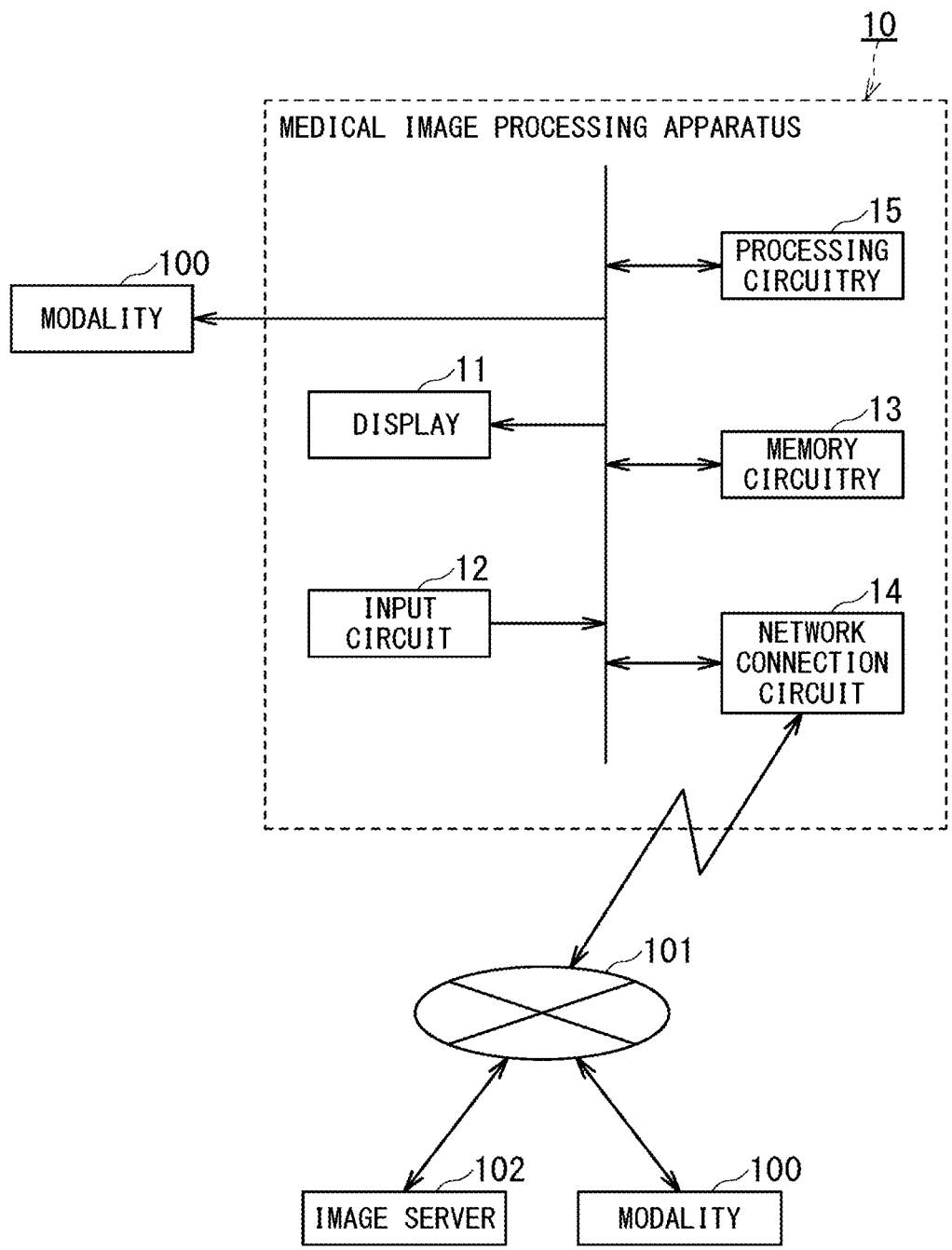
FIG. 1 is a block diagram showing a configuration example of a medical image processing apparatus according to an embodiment of the present invention.

FIG. 1 is a block diagram showing a configuration example of a medical image processing apparatus 10 according to an embodiment of the present invention.

As shown in FIG. 1, the medical image processing apparatus 10 includes a display 11, an input circuit 12, memory circuitry 13, a network connection circuit 14, and processing circuitry 15.

The display 11 is made up, for example, of a typical display output apparatus such as a liquid crystal display or an OLED (Organic Light Emitting Diode) display and adapted to display various images including medical images under control of the processing circuitry 15.

The input circuit 12 includes at least a pointing device, comprises, for example, typical input devices such as a mouse, track ball, keyboard, touch panel, numeric keypad, and outputs an operation input signal corresponding to user operation to the processing circuitry 15.

The memory circuitry 13 stores medical image data (including volume data, which is three-dimensional medical image data) outputted from modalities 100 as well as reconstructed image data. The modalities 100 can be made up of medical diagnostic imaging apparatus such as an X-ray CT (Computed Tomography) apparatus, MRI (Magnetic Resonance Imaging) apparatus, X-ray diagnostic apparatus, and nuclear medical diagnostic imaging apparatus, which can generate medical image data based on projection data obtained by imaging a subject (patient).

The network connection circuit 14 implements various information and communications protocols corresponding to a form of a network 101. The network connection circuit 14 connects the medical image processing apparatus 10 with other electrical equipment using the various protocols. The network 101 here means information and communications networks in general which use telecommunications technology, and includes a wireless/wired LAN of a hospital's main LAN (Local Area Network), the Internet, a telephone line network, an optical fiber communications network, a cable communications network, and a satellite communications network.

The medical image processing apparatus 10 may receive medical image data from the modalities 100 and image server 102 connected via the network 101. Volume data received through the network 101 is also stored in the memory circuitry 13. Note that the medical image processing apparatus 10 may be included in each of the modalities 100 as a component of the modality 100.

The image server 102, which is, for example, a long-term storage server for images provided in a PACS (Picture Archiving and Communication System), stores reconstructed images or volume data generated by the modalities 100 such as an X-ray CT (Computed Tomography) apparatus, MRI (Magnetic Resonance Imaging) apparatus, X-ray diagnostic apparatus, and nuclear medical diagnostic imaging apparatus connected via the network 101.

The processing circuitry 15 includes at least a processor. For example, the processing circuitry 15 includes, a processor and memory circuitry such as a RAM and ROM, and controls operation of the medical image processing apparatus 10 according to a program stored in the memory circuitry.

The processor of processing circuitry 15 loads a registration program and data needed to execute the program into the RAM from the memory circuitry including the ROM, and performs processes for improving registration accuracy of rigid regions according to the program.

The RAM of the processing circuitry 15 provides a work area for use to temporarily store data as well as the program executed by the processor. The memory circuitry of the processing circuitry 15, including the ROM, stores a startup program of the medical image processing apparatus 10, the registration program and various data needed to execute these programs. Note that the memory circuitry including the ROM may have a configuration which includes processor-readable memory circuitry such as a magnetic or optical recording medium or a semiconductor memory, from which some or all of programs and data are downloaded via an electronic network.

Figure 2:
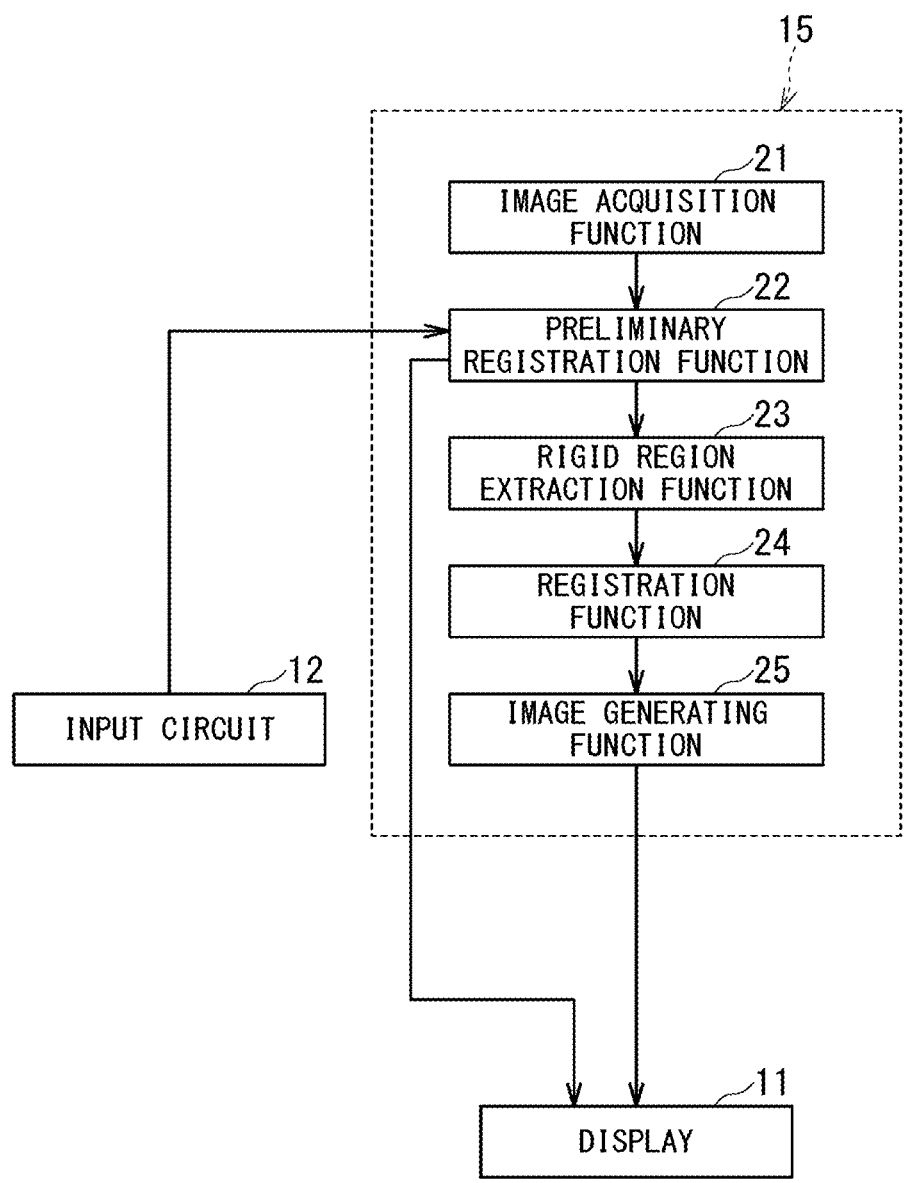
FIG. 2 is a schematic block diagram showing an example of functions implemented by the processor of the processing circuitry.

FIG. 2 is a schematic block diagram showing an example of functions implemented by the processor of the processing circuitry 15.

As shown in FIG. 2, the processor of the processing circuitry 15 serves at least as an image acquisition function 21, a preliminary registration function 22, a rigid region extraction function 23, a registration function 24, and an image generating function 25 under the registration program. Each of these functions is stored in the memory circuitry in the form of a program.

The image acquisition function 21 acquires plural items of medical image data from the modalities 100 or image server 102 and stores the acquired data in the memory circuitry 13. It is advisable that the plural items of medical image data are obtained by imaging a same anatomical region of a same subject.

The preliminary registration function 22 preliminarily registers at least first medical image data and second medical image data out of plural items of medical image data. For example, the preliminary registration function 22 preliminarily registers the first medical image data and second medical image data in response to manual registration performed by a user via the input circuit 12. In this case, medical image A and medical image B displayed on the display 11 based on the first medical image data and second medical image data are registered manually by the user via the input circuit 12 on a preliminary basis.

Also, the preliminary registration function 22 may preliminarily register the first medical image data and second medical image data by performing at least one of non-rigid registration and rigid registration on the whole.

Note that the preliminary registration may be omitted. When preliminary registration is unnecessary, the medical image processing apparatus 10 does not need to have the preliminary registration function 22.

Figure 3:
FIG. 3 is an explanatory diagram showing an example of how a rigid region is extracted and a mask region is set by the rigid region extraction function.
Figure 3:
Figure 3:
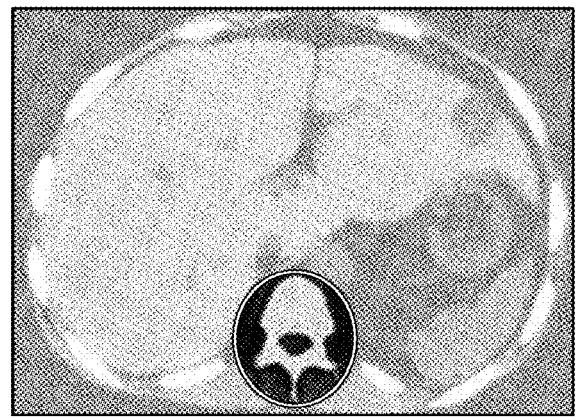
Figure 3:
Figure 3:

FIG. 3 is an explanatory diagram showing an example of how a rigid region is extracted and a mask region is set by the rigid region extraction function 23.

The rigid region extraction function 23 identifies a rigid region including a rigid portion in a predetermined medical image data among plural items of medical image data and extracts the rigid region from the predetermined medical image data.

An image region identified as a rigid region corresponds, for example, to a bone region, calcified region, or stent. Note that the predetermined medical image data from which the rigid region is extracted may be either of the first medical image data and second medical image data subjected to registration.

The rigid region extraction function 23 may configure a contour of the rigid portion into a shape along an edge of the rigid portion or an elliptical or rectangular shape surrounding the rigid portion. FIG. 3 shows an example in which an elliptically shaped region surrounding a rigid portion is extracted as a rigid region from predetermined medical image data.

The first medical image data and second medical image data subjected to registration may be, for example, part of one or more series of medical image data picked up by an X-ray CT apparatus serving as a modality 100. Also, the first medical image data and second medical image data may be image data picked up before injection of a contrast medium (pre-contrast image data) and image data picked up after the injection of the contrast medium (contrast image data). Also, the first medical image data and second medical image data may be image data resulting from cardiac-gated imaging and differing in heartbeat phase or image data resulting from respiratory-gated imaging and differing in respiratory phase. Besides, the first medical image data and second medical image data may be generated by different modalities 100.

One or a combination of a pixel value threshold, Bayesian inference, differential edge detection, and the like may be used for identification of a rigid region. For example, when the medical image data is CT image data, a rigid region can be identified using a predetermined CT value as a threshold. Also, when the medical image data is contrast image data, pixel values originating from the contrast medium and pixel values originating from a rigid region can be separated precisely using Bayesian inference.

Also, when extracting rigid regions from predetermined medical image data, the rigid region extraction function 23, may extract only rigid regions smaller than a predetermined size. For example, when a rigid portion noted by the user (hereinafter referred to as a target rigid portion) is a small-volume portion of lime or the like in an organ such as the heart, desirably large-volume rigid portions, such as the spine, other than the target rigid portion are not extracted as rigid regions. This is because if a rigid portion larger than the target rigid portion is extracted together with the target rigid portion and if the both portions are connected and unified in the same mask region described later, then, when the rigid registration on the connected mask region is performed, the rigid portion larger than the target rigid portion is registered during rigid registration, which could make registration of the target rigid portion inadequate.

Thus, the rigid region extraction function 23 may set the target rigid portion to be included in the rigid region according to the instruction of the user via the input circuit 12 or the initial configuration. The rigid region extraction function 23 then acquires information about the predetermined size corresponding to this set target rigid portion, and extracts only a rigid region smaller than the predetermined size from the predetermined medical image data based on the acquired information without extracting the rigid regions larger than the predetermined size.

Specifically, the rigid region extraction function 23 identifies rigid regions (e.g., connected components made up of pixels having pixel values equal to or larger than a predetermined pixel value threshold) in the predetermined medical image data and then extracts a rigid region from the identified rigid regions: extracting only the rigid region whose volume is smaller than a predetermined size corresponding to the target rigid region if the medical image data is volume data or only the rigid region whose area is smaller than a predetermined size corresponding to the target rigid region if the medical image data is two-dimensional medical image data. By extracting only the rigid region smaller than the predetermined size and corresponding to the target rigid portion, it is possible to perform rigid registration with high accuracy without being affected adversely by other, large rigid portions even if the target rigid portion is small.

More specifically, the rigid region extraction function 23 may set the type of the target rigid portion, e.g. "a hard stone formed in the heart", "a hard stone formed in the gall bladder", "spine" or the like, according to the instruction of the user via the input circuit 12 or the initial configuration. In this case, the predetermined size is desirably set to the size corresponding to the type of the target rigid portion, for instance, the predetermined size corresponding to the hard stone formed in the hart is set to 1.5 cm.

Further, the target rigid portion may be set on the medical image displayed on the display 11 with the designation by the user. In this case, the rigid region extraction function 23 may set the target rigid portion by using the outline manually set by the user who confirms the medical image displayed on the display 11 and sets the outline via the input circuit 12. Further, the rigid region extraction function 23 may set the target rigid portion semi-automatically such that information on one point considered by the user to belong to the target rigid portion is received by a click operation or the like by the user via the input circuit 12 and is subjected to segmentation (region expansion) from a position of this one point, for example.

In this case, the predetermined size may be set to have the size of an enlarged target rigid portion, where the enlarged target rigid portion is obtained by enlarging the target rigid portion set manually or semi-automatically by the predetermined width of expansion. The predetermined width of expansion may include zero. Further in this case, the rigid region extraction function 23 may also set the type of the target rigid portion. The predetermined width of expansion is desirably set to the size corresponding to the type of the target rigid portion when the predetermined size is set to have the size of the enlarged target rigid portion obtained by enlarging the target rigid portion set manually or semi-automatically, and when the type of the target rigid portion is also set. In this case, the predetermined width corresponding to the hard stone may be set to several centimeters, while the predetermined width corresponding to the bone may be set to several millimeters, for instance.

Note that association information about the predetermined size associated with the type of the target rigid portion or association information about the predetermined width of expansion associated with the type of the target rigid portion may be stored in the memory circuitry 13 in advance or provided to the rigid region extraction function 23 by the user via the input circuit 12.

Also, the rigid region extraction function 23 may accept a command to change a region size or position of an automatically extracted rigid region from the user via the input circuit 12 and may modify the rigid region in response to the change command. In this case, desirably the modified rigid region undergoes rigid registration while regions other than the modified rigid region undergo non-rigid registration. Besides, the rigid region modified in response to the change command may also be used, for example, as a region which provides setting criteria for a mask region described later.

Also, the rigid region extraction function 23 may accept a command to set a region of interest as a preliminary rigid region from the user via the input circuit 12. In this case, the rigid region extraction function 23 can extract a rigid region from the region of interest specified by the user on predetermined medical image data.

Also, the rigid region extraction function 23 sets a mask region over the extracted rigid region in an expanded form so as to include the extracted rigid region and generates a mask image by extracting only the mask region from the predetermined medical image data. The rigid region extraction function 23 sets the mask region by expanding, for example, the rigid region by a predetermined number of pixels (e.g., by ten pixels). When, the medical image data is volume data, a mask image is generated using a mask region obtained by expanding the rigid region by a predetermined number of voxels from surfaces of the rigid region in three-dimensional directions. Also, the rigid region extraction function 23 may accept a command to change a region size or position of a set mask region from the user via the input circuit 12 and may modify the mask region in response to the change command.

The registration function 24 performs, between the first medical image data and second medical image data, rigid registration on a rigid region and performs non-rigid registration on regions (non-rigid regions) other than the rigid region. Also, when a mask region is set, the registration function 24 performs rigid registration of the mask region and non-rigid registration of regions (non-mask regions) other than the mask region between the first medical image data and second medical image data.

Figure 4:
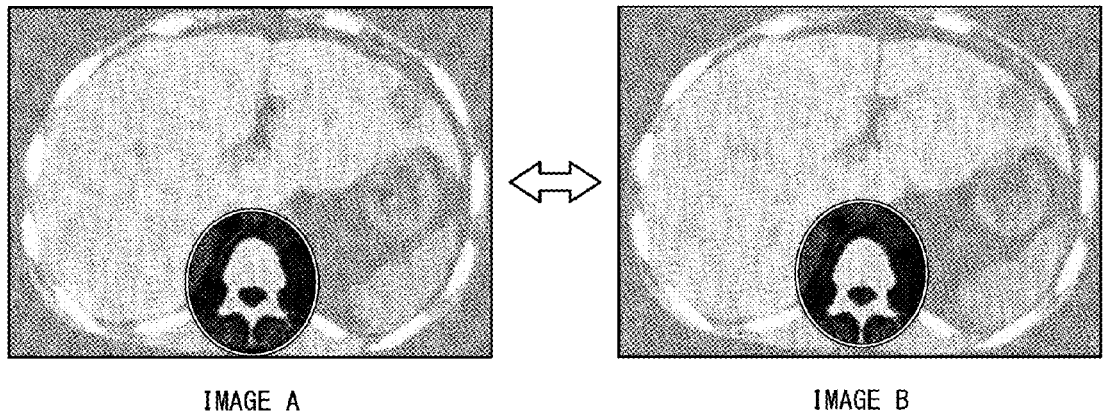
FIG. 4 is an explanatory diagram showing an example of how a rigid registration of a mask region is performed between first medical image data and second medical image data.
Figure 5:
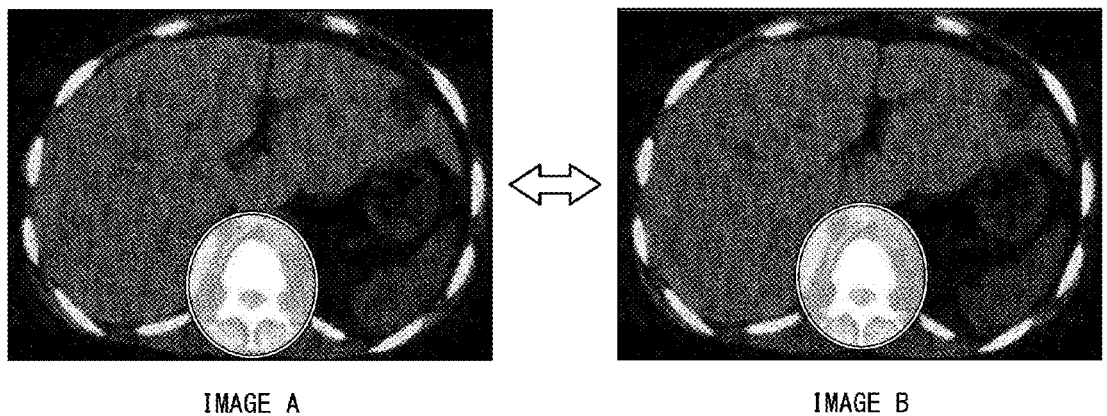
FIG. 5 is an explanatory diagram showing an example of how a non-rigid registration of a non-mask region is performed between first medical image data and second medical image data.

FIG. 4 is an explanatory diagram showing an example of how a rigid registration of a mask region is performed between first medical image data and second medical image data. FIG. 5 is an explanatory diagram showing an example of how a non-rigid registration of a non-mask region is performed between first medical image data and second medical image data. Note that medical image A and medical image B shown in FIGS. 4 and 5 are based on the first medical image data and second medical image data, respectively.

When a mask region is set, the registration function 24 performs a masking process, for example, on all the plural items of medical image data using the mask image (see the bottom photo of FIG. 3). Then, the registration function 24 performs rigid registration of only the mask region between the first medical image data subjected to the masking process and the second medical image data subjected to the masking process (see FIG. 4). The rigid registration is image registration based on linear transformation. The linear transformation includes rotation, translation, expansion/contraction, and shearing. The registration function 24 performs rigid registration by finding a linear transformation equation between the first medical image data and second medical image data.

Also, the registration function 24 performs non-rigid registration of the non-mask region between the first medical image data subjected to the masking process and the second medical image data subjected to the masking process (see FIG. 5). The non-rigid registration is image registration based on nonlinear transformation. The nonlinear transformation is transformation which is nonlinear different from the linear transformation. Examples of nonlinear transformation include FFD (free form deformation) and TPS (thin plate spline) based on B spline functions.

The image generating function 25 generates medical image A and medical image B based on the first medical image data and second medical image data subjected to rigid registration and non-rigid registration by the registration function 24 and displays the images on the display 11. Also, when generating medical image A and medical image B, the image generating function 25 may perform a smoothing process on a boundary between the region subjected to rigid registration and the region subjected to non-rigid registration.

Next, description will be given of an example of operation of the medical image processing apparatus 10 and medical image processing method according to the present embodiment.

Figure 6:
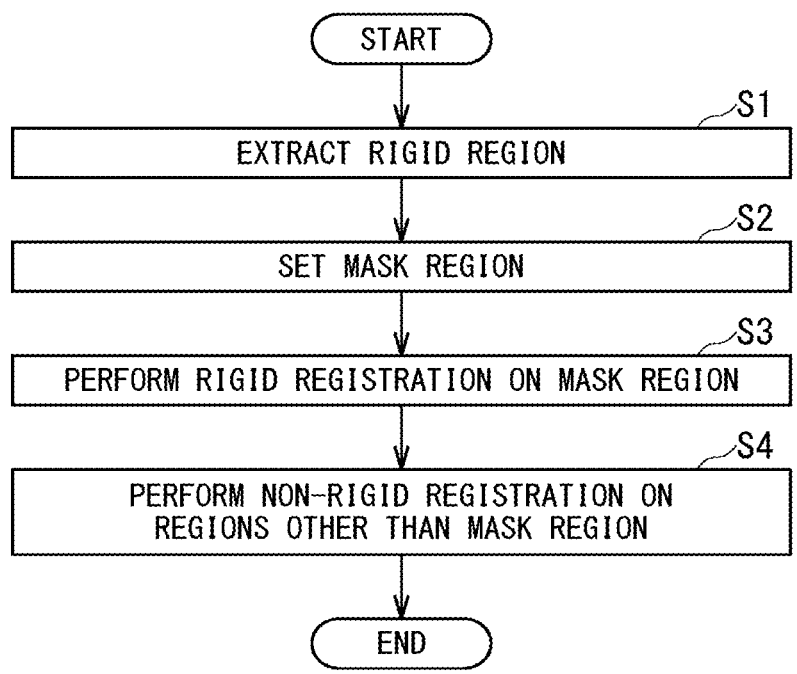
FIG. 6 is a flowchart showing an example of a procedure used by the processor of the processing circuitry shown in FIG. 1 to improve registration accuracy of a rigid region.

FIG. 6 is a flowchart showing an example of a procedure used by the processor of the processing circuitry 15 shown in FIG. 1 to improve registration accuracy of a rigid region. In FIG. 6, the reference signs made up of the letter S followed by a number represent respective steps of the flowchart.

The procedure starts as plural items of medical image data are acquired by the image acquisition function 21. When the medical image processing apparatus 10 is equipped with the preliminary registration function 22, the procedure starts as the preliminary registration function 22 preliminarily registers at least the first medical image data and second medical image data out of plural items of medical image data. Also, the following procedure is an example in which the rigid region extraction function 23 sets a mask region.

In step S1, the rigid region extraction function 23 identifies a rigid region including a rigid portion in a predetermined medical image data among plural items of medical image data and extracts the rigid region from the predetermined medical image data.

Next, in step S2, the rigid region extraction function 23 sets a mask region over the extracted rigid region in an expanded form so as to include the extracted rigid region (see the bottom photo of FIG. 3).

Next, in step S3, the registration function 24 performs rigid registration of only the mask region between the first medical image data and second medical image data subjected to a masking process (see FIG. 4).

Next, in step S4, the registration function 24 performs non-rigid registration of the non-mask region between the first medical image data subjected to the masking process and the second medical image data subjected to the masking process (see FIG. 5).

The above procedure can improve registration accuracy of the rigid region. Note that step S3 and step S4 do not have to be carried out in time sequence in the order in which they are described, and may be carried out in reverse order or in parallel.

The medical image processing apparatus 10 according to the present embodiment extracts a rigid region from medical image data, performs rigid registration of the extracted rigid region, and non-rigid registration of the region (non-rigid region) other than the extracted rigid region. This makes it possible to improve the registration accuracy of the rigid region. Consequently, misregistration can be reduced greatly when the first medical image data and second medical image data registered with each other are subtracted from each other. Thus, artifacts in subtraction images can be reduced greatly, making it possible to improve accuracy of diagnosis which uses the subtraction images.

Also, the medical image processing apparatus 10 extracts a rigid region by precisely separating pixel values originating from the contrast medium and pixel values originating from the rigid region, Then, the medical image processing apparatus 10 performs rigid registration of only the extracted rigid region. Thus, the medical image processing apparatus 10 can precisely perform registration between a contrast image and pre-contrast image even if changes are caused to image characteristics by the contrast medium.

With at least one of the above-described embodiments, the medical image processing apparatus extracts a rigid region from medical image data, performs rigid registration of the extracted rigid region, and non-rigid registration of the region (non-rigid region) other than the extracted rigid region. This makes it possible to improve the registration accuracy of the rigid region.

The processing circuitry in the above-described embodiments is an example of the processing circuitry described in the claims. In addition, the term "processor" used in the explanation in the above-described embodiments, for instance, a circuit such as a dedicated or general-purpose CPU (Central Processing Unit), a dedicated or general-purpose GPU (Graphics Processing Unit), an ASIC (Application Specific Integrated Circuit), a programmable logic device including an SPLD (Simple Programmable Logic Device) and a CPLD (Complex Programmable Logic Device) as examples, and an FPGA (Field Programmable Gate Array). A processor implements various types of functions by reading out programs stored in the memory circuit and executing the programs.

In addition, programs may be directly installed in the circuit of a processor instead of storing programs in the memory circuit. In this case, the processor implements various types of functions by reading out programs stored in its own circuit and executing the programs. Moreover, each function of the processing circuitry may be implemented by processing circuitry configured of a single processor. Further, the processing circuitry may be configured by combining plural processors independent of each other so that each function of the processing circuitry is implemented by causing each processor to execute the corresponding program. When plural processors are provided for the processing circuitry, a memory circuit for storing the programs may be provided for each processor or one memory circuit may collectively store all the programs corresponding to all the processors.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Further, although an example of processing the steps of the flowchart is described in the embodiments in which each steps are time-sequentially performed in order along the flowchart, each step of the flowchart may not be necessarily processed in a time series, and may be executed in parallel or individually executed.

The invention claimed is:

1. A medical image processing apparatus comprising processing circuitry configured to:
   extract a rigid region from predetermined medical image data among a plurality of items of medical image data; and
   perform rigid registration on the rigid region and perform non-rigid registration on a region other than the rigid region, between first medical image data and second medical image data among the plurality of items of medical image data.

2. The medical image processing apparatus according to claim 1, wherein the processing circuitry:
   sets a target rigid portion to be included in the rigid region; and
   extracts, as the rigid region, a rigid region having a size smaller than a size corresponding to the set target rigid portion from the predetermined medical image data.

3. The medical image processing apparatus according to claim 1, wherein the processing circuitry:
   modifies the extracted rigid region according to a command to modify the rigid region, the command being received from a user via an input circuit; and
   performs rigid registration on the modified rigid region and performs non-rigid registration on a region other than the modified rigid region.

4. The medical image processing apparatus according to claim 1, wherein the processing circuitry:
   receives a region setting command from a user via an input circuit; and
   extracts the rigid region from the predetermined medical image data within a region set by the region setting command.

5. The medical image processing apparatus according to claim 1, wherein the processing circuitry extracts the rigid region by extracting pixels having pixel values equal to or larger than a predetermined pixel value from the predetermined medical image data.

6. The medical image processing apparatus according to claim 1, wherein the processing circuitry:
   extracts the rigid region from the predetermined medical image data;
   sets a mask region over the rigid region in an expanded form so as to include the rigid region; and
   performs rigid registration on the mask region and performs non-rigid registration on a region other than the mask region.

7. The medical image processing apparatus according to claim 6, wherein the processing circuitry:
   modifies the mask region according to a command to modify the mask region, the command being received from a user via an input circuit; and
   performs rigid registration on the modified mask region and performs non-rigid registration on a region other than the modified mask region.

8. The medical image processing apparatus according to claim 1, wherein the plurality of items of medical image data are obtained by imaging a same anatomical region of a same subject.

9. The medical image processing apparatus according to claim 1, wherein the processing circuitry:
   generates a first medical image based on the first image data and a second medical image based on the second image data, the first medical image data and the second medical image data being subjected to rigid registration and non-rigid registration; and
   displays the first medical image and the second medical image on the display.

10. The medical image processing apparatus according to claim 9, wherein the processing circuitry generates the first medical image and the second medical image by performing a smoothing process on a boundary between a region subjected to rigid registration and a region subjected to non-rigid registration.

11. The medical image processing apparatus according to claim 1, wherein the first medical image data and the second medical image data are medical image data picked up before injection of a contrast medium into a subject and medical image data picked up after the injection of the contrast medium, respectively.

12. The medical image processing apparatus according to claim 1, wherein the processing circuitry preliminarily registers the first medical image data and the second medical image data before extraction of the rigid region.

13. The medical image processing apparatus according to claim 1, wherein the predetermined medical image data is one of the first medical image data and the second medical image data.

14. A medical image processing method comprising:
   extracting a rigid region from predetermined medical image data among a plurality of items of medical image data;
   performing rigid registration on the rigid region between first medical image data and second medical image data among the plurality of items of medical image data; and
   performing non-rigid registration on a region other than the rigid region between the first medical image data and the second medical image data among the plurality of items of medical image data.

* * * * *